March 25, 1952

J. F. GORDON 2,590,308

RADAR PULSING SYSTEM

Filed June 15, 1949

Inventor
JAMES F. GORDON

By Killman and Kerst
Attorneys

Patented Mar. 25, 1952

2,590,308

UNITED STATES PATENT OFFICE 2,590,308

RADAR PULSING SYSTEM

James F. Gordon, Towson, Md., assignor to Bendix Aviation Corporation, Towson, Md., a corporation of Delaware Application June 15, 1949, Serial No. 99,320

3 Claims. (Cl. 250—17)

This invention relates to pulse type transmission systems and is particularly directed to the prevention of adjacent channel interference during the operation of such systems.

It is well known that self-exciting oscillators used in pulse service for radar type transmitters exhibit an undesirable frequency modulation which creates an output covering a large spectrum. Where such oscillators operate near adjacent channels interference occurs as a direct result of the broad spectrum.

The frequency and phase modulation of such an oscillator is created during the leading edge of the energizing power pulse. It takes a finite time for the oscillator output voltage to build up to a stable maximum and during this time a frequency variation takes place. The oscillator frequency is usually lower at the beginning of the pulse, rising to its highest frequency as the output reaches a stable value.

It is an object of this invention to prevent the radiation of undesirable frequency modulated portions of a pulse type signal.

This and other objects and advantages of the invention are realized by a system in which the oscillator is energized for a short period before energy is radiated from the system. In this manner only energy which has reached a stable frequency is allowed to be radiated.

Figures 1, 2:
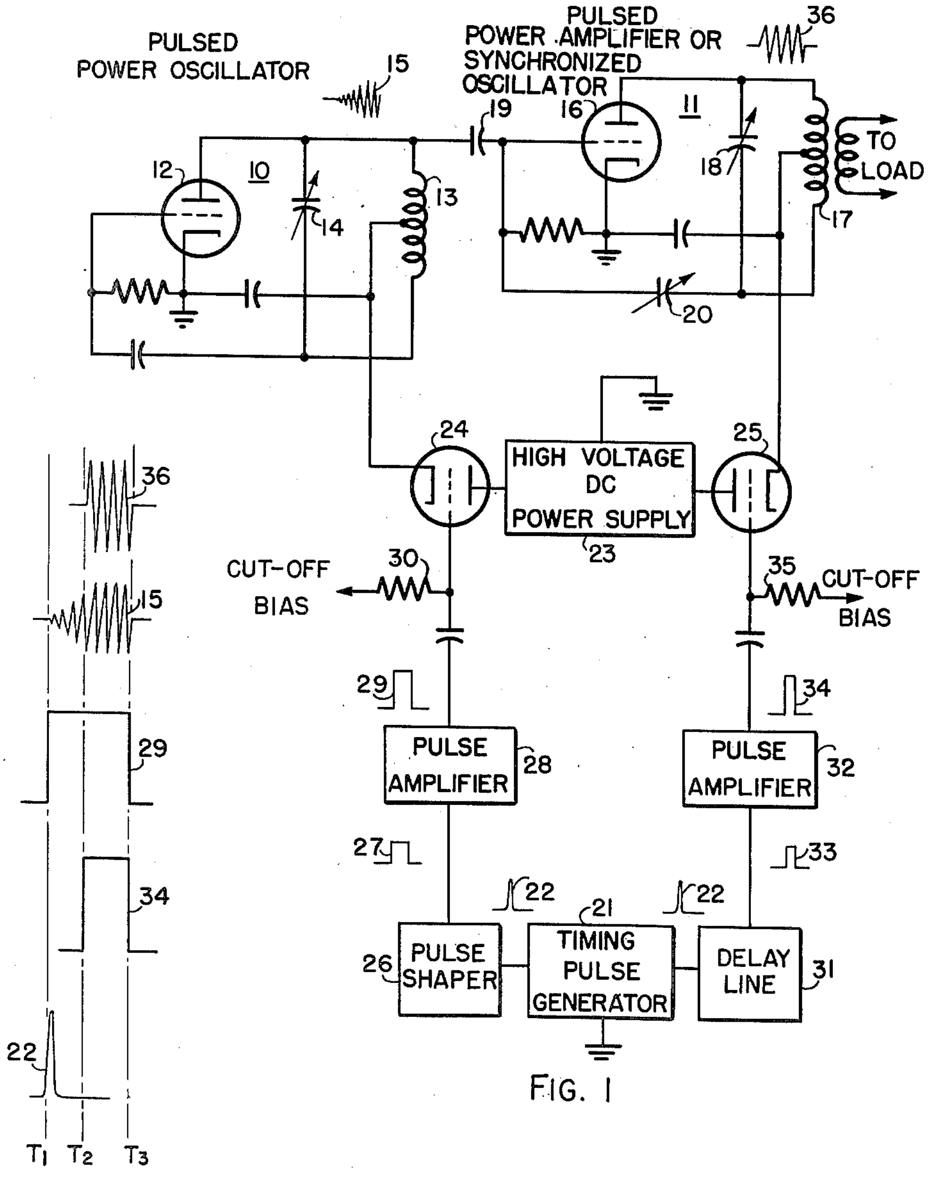
Fig. 1 is a schematic diagram of the circuit of a pulsing system embodying the invention.
Fig. 2 is a family of time related curves, depicting the wave shapes existing at various points in the system.

Referring now more particularly to the drawings, there is shown in Fig. 1, a pulsed power oscillator circuit 10, the output of which is fed to a pulsed power amplifier 11, the output of the latter being radiated as the signal output of the system. The oscillator 10 is of the Hartley type including an electron tube 12 and a tank circuit composed of inductor 13 and capacitor 14. The output wave form of this oscillator, when pulse excited, is indicated by the curve 15 adjacent the tank circuit and which is also shown in Fig. 2.

The power amplifier 11 includes an electron tube 16 having a tank circuit composed of inductor 17 and capacitor 18. The output of the oscillator 10 is coupled to the input circuit of the amplifier 11 by means of a coupling capacitor 19. A capacitor 20 is connected between the tank circuit of the amplifier and its grid for neutralization purposes. The inductor 17 forms the primary of the output transformer of the system.

The curve 15 representing the output wave form of the oscillator 10 shows a leading edge which rises gradually from a zero value to the full stable output of the oscillator signal. It is this rising portion of the wave form which is subject to frequency variation and which produces undesirable adjacent channel interference when radiated. In the portion of the system not yet described means are provided for preventing the radiation of this portion of the oscillator output.

This means comprises a timing pulse generator 21, having the output wave form indicated in the curve 22, which is likewise shown in Fig. 2. A common high voltage D. C. power supply 23 is shown for the oscillator 10 and the amplifier 11. It should be understood, however, that a common power supply is not essential to the operation of the system, separate power supplies being equally satisfactory. In the quiescent condition of the system, the power supply is not connected to either the oscillator or the amplifier. Interposed between the power supply and the oscillator 10, is an electron tube 24, the anode of which is connected to the power supply and the cathode of which is connected to a center tap on the inductor 13. Likewise interposed between the amplifier 11 and the power supply is an electron tube 25, having its anode connected to the power supply and its cathode to a center tap on the inductor 17.

Between the output of the timing pulse generator 21 and the control grids of the respective electron tubes 24 and 25, there are established a pair of translation channels. The channel connecting the output of the pulse generator 21 to the grid of tube 24 includes a pulse shaper 26 on which the output of the generator is impressed. In the pulse shaper 26, the timing pulses are transformed into square waves of the form indicated by the curve 27, having a duration greater than that of the pulse which it is desired to ultimately transmit by a period equal to the duration of the build-up portion of the output wave form of the oscillator 10. These square pulses are amplified in a pulse amplifier 28 which produces an output having the wave form indicated by curve 29. This output is applied to the control grid of tube 24 where it overcomes the cut-off bias applied to that through a resistor 30 and causes the tube to become conductive, thus completing a conductive path between the high voltage power supply and the plate of tube 12. The oscillator 10 is thereupon excited and produces a signal having the wave form 15.

The second translation channel, which connects the pulse generator 21 with electron tube 25, comprises a delay line 31 and pulse amplifier 32. The output of the pulse generator is impressed upon the delay line 31 to produce a square wave output having the wave form shown by curve 33. This square wave has the duration which it is desired to impart to the ultimately radiated signal. The leading edge of this wave form is delayed by the delay line 31 for a period of time equal to the build-up time of the wave form 15. The output of the delay line 31 is amplified by the pulse amplifier 32 to produce a pulse output having the wave form indicated by curve 34. This output is applied to the control grid of electron tube 25 to overcome the cut-off bias applied to that grid through resistor 35. The electron tube 25 is thus rendered conductive for the duration of the pulse 34 and thus establishes a conductive path between the power supply 23 and the plate of electron tube 16.

The relationship of the voltage wave forms at the various points of the circuit is illustrated in Fig. 2 in which the various wave forms are superimposed upon a common time axis. The wave form of the output of the power amplifier is indicated by the curve 36. Thus there is no output from the power amplifier 11 during the build-up time of the output oscillator 10. In the operation of the system it can be seen that the oscillator 10 is normally unexcited and the power amplifier 11 is normally non-conductive due in both cases to the interruption of the power supply circuit by the tubes 24 and 25. At a time $T_1$ as indicated in Fig. 2, the timing pulse generator generates a timing pulse having the wave form 22 which is shaped and amplified to a wave form 29, the latter being a square wave having its leading edge at $T_1$ and its trailing edge at $T_3$. This wave being applied to the control grid of tube 24 causes the oscillator 10 to be excited from the time $T_1$ until the time $T_3$. The oscillator builds up an output which rises from zero level at $T_1$ to a maximum stable level at a time $T_2$. Turning now to the other pulse translation channel, we find the output of the pulse generator 21 applied to the delay line 31 in which a pulse, as shown at 33, is formed, this pulse being delayed so that its leading edge occurs at time $T_2$ and being shaped to have a duration such that its trailing edge occurs at time $T_3$. This pulse is amplified in amplifier 32 to the form 34 which is applied to the control grid of tube 25 to render that tube and the power amplifier 11 conductive from time $T_2$ to time $T_3$.

Among the advantages flowing from the invention is the fact that during the pulse output period the amplifier presents a constant load to the oscillator such that the oscillator is not subjected to a variable load during the output pulse period. The constant oscillator load during output pulsing is a function then of the characteristics of pulse 34 which may be made to be excellent.

The system has been illustrated as utilizing a timing pulse generator having an output of very sharp, exponential type pulses and a delay line of the electronic type, which could be a multivibrator having an output of the square wave type shown at 33. It is equally feasible, however, to employ a timing pulse generator which produces a square wave output of the type shown at 27, thus eliminating the pulse shaper 26. In that case, the leading edge of these pulses may be used to initiate a delayed pulse of the type shown at 33, utilizing either an electronic delay line or one of the passive type.

This system is applicable to microwave radar systems using resonant lines and cavities as well as LC lumped circuits.

In some applications it may be desirable to use the pulsed power amplifier as a synchronized oscillator in which case capacitor 20 may be adjusted for proper grid plate feedback. Although this may not be the ideal arrangement for some purposes, there are applications where a saving in oscillator power input by such an arrangement is desirable.

What is claimed is:

1. In a radio pulse echo system: a pulsed power oscillator feeding a pulsed power amplifier, the output of which is radiated as a signal, a source of timing pulses, a source of plate voltage for said oscillator and said amplifier, means providing a normally non-conductive path between said source of plate voltage and said oscillator, means shaping said timing pulses and applying said shaped pulses to said path in a manner to render it conductive for the duration thereof, said shaped pulses being of greater duration than said timing pulses, means providing a normally non-conductive path between said source of plate voltage and said amplifier, a pulse delaying and squaring circuit, means impressing timing pulses from said source on said circuit, said circuit squaring said timing pulses and delaying them by an interval which taken together with the duration of each of said squared pulses is equal to the duration of each of said shaped pulses and means applying said delayed pulses to the path between said source of plate voltage and said amplifier to render the same conductive for the duration thereof.

2. In a radio pulse echo system comprising a pulsed power oscillator feeding a synchronized oscillator, the output of which is radiated as a signal, and a source of timing pulses, both of said oscillators being normally in a non-conductive state: means synchronized with said timing pulses and rendering said power oscillator conductive coincident with each of said timing pulses, and means synchronized with said timing pulses rendering said synchronized oscillator conductive as soon after the incidence of each of said timing pulses as the output of said power oscillator has reached a stable level.

3. In a radio pulse echo system comprising a pulsed power oscillator feeding a synchronized oscillator, the output of which is radiated as a signal, and a source of timing pulses: means normally rendering both of said oscillators quiescent, means generating a series of timing pulses, means forming each of said generated pulses into a square wave, means acted on by each of said square waves to render said power oscillator conductive for the duration thereof, means responsive to said timing pulses to generate a series of square waves delayed with respect to said timing waves, and means acted upon by each of said delayed waves to render said synchronized oscillator conductive for the duration thereof.

JAMES F. GORDON.

REFERENCES CITED

The following references are of record in the file of this patent:

UNITED STATES PATENTS

| Number | Name | Date |
|---|---|---|
| 2,113,371 | Dyson | Apr. 5, 1938 |
| 2,114,332 | Bruckner et al. | Apr. 19, 1938 |
| 2,187,603 | Hall | Jan. 16, 1940 |
| 2,401,807 | Wolff | June 11, 1946 |

FOREIGN PATENTS

| Number | Country | Date |
|---|---|---|
| 504,428 | Germany | Aug. 13, 1930 |